United States Patent
van Weerden et al.

(10) Patent No.: US 6,539,150 B2
(45) Date of Patent: Mar. 25, 2003

(54) SEGMENTED WAVEGUIDE FLATTENING THE PASSBAND OF A PHASAR

(75) Inventors: Harm van Weerden, Enschede (NL); Frederik Marcel van der Vliet, Enschede (NL)

(73) Assignee: Alcatel Optronics UK Limited (GB)

( * ) Notice: Subject to any disclaimer, the term of this patent is extended or adjusted under 35 U.S.C. 154(b) by 20 days.

(21) Appl. No.: 09/736,087

(22) Filed: Dec. 13, 2000

(65) Prior Publication Data

US 2002/0094166 A1 Jul. 18, 2002

(51) Int. Cl.$^7$ ................................................. G02B 6/26
(52) U.S. Cl. ............................ 385/39; 385/14; 385/31; 385/37; 385/42; 385/47; 385/129; 385/130; 359/115; 359/124; 359/130
(58) Field of Search ............................ 385/31, 24, 14, 385/37, 42, 43, 47, 129, 130, 131, 132; 359/115, 124, 130

(56) References Cited

U.S. PATENT DOCUMENTS

| | | | |
|---|---|---|---|
| 5,539,845 A | | 7/1996 | van der Tol ................... 385/11 |
| 5,636,300 A | * | 6/1997 | Keck et al. .................... 385/24 |
| 5,687,272 A | * | 11/1997 | Vinchant et al. ............... 372/50 |
| 5,889,906 A | * | 3/1999 | Chen ........................... 359/115 |
| 6,222,963 B1 | * | 4/2001 | Grand et al. .................. 385/37 |
| 6,339,664 B1 | * | 1/2002 | Farjady et al. ................ 385/24 |
| 6,442,314 B2 | | 8/2002 | Nara et al. ..................... 385/37 |

FOREIGN PATENT DOCUMENTS

| | | | |
|---|---|---|---|
| EP | 0 513 919 | 11/1992 | ............... 385/28 X |
| EP | 0 721 120 A1 | 7/1996 | ............... 385/24 X |
| EP | 1 128 193 | 8/2001 | ............... 385/37 X |

* cited by examiner

Primary Examiner—Brian Healy
(74) Attorney, Agent, or Firm—Charles S. Guenzer

(57) ABSTRACT

A phasar (arrayed waveguide grating) including a segmented waveguide disposed between the phasar and one of the single-mode waveguides on either the input or output side of the phasar. The segmented waveguide is optimized to produce a flattened passband of the phasar, thereby minimizing variations in the phasar spectral response. The optimization may be performed by an evolutionary algorithm which generates random variations into the design population and selects the better members in a multi-generational selection process. The flattened passband phasar is particularly useful in a wavelength-division multiplexing (WDM) fiber communications network.

36 Claims, 6 Drawing Sheets

SEGMENTED WAVEGUIDE FLATTENING THE PASSBAND OF A PHASAR

FIELD OF THE INVENTION

In general, the invention relates to integrated optics formed on a chip. In particular, the invention relates to a wavelength dispersive optical structure such as an arrayed waveguide demultiplexing/switching element.

BACKGROUND ART

Arrayed waveguide (AWG) multiplexers, also referred to as phasars, have become an important component in many optical systems, particularly in wavelength division multiplexing (WDM) telecommunication systems. A WDM network uses a single optical fiber to carry a multiplicity of optical carriers at different wavelengths, each modulated with its own data signal. Electronics and opto-electronics are generally limited to data rates of 10 to 40 gigabits per second (Gbs). In WDM, with the proper optical multiplexing and demultiplexing at the ends of the fiber, the electronics can be operated in parallel on the wavelength separated carriers to achieve better utilization of the fiber bandwidth, which may be as high as 300 terahertz (THz). WDM effectively multiplies the transmission capacity of the fiber by the number of optical carriers.

An example of a WDM telecommunication system is illustrated in FIG. 1. Multiple (N) electronic data channels enter a transmitter 10 and modulate separate optical emitters such as lasers 12 having N respective free-space output carrier wavelengths $\lambda_1, \lambda_2, \ldots \lambda_N$. The number N of WDM channels is increasing to 64 and beyond. The wavelengths correspond to respective optical frequencies $f_i = c/\lambda_i$, where c is the speed of light, resulting in N frequencies $f_1, f_2, \ldots f_N$. Conveniently, these frequencies are arranged in a WDM frequency comb having the neighboring wavelengths $f_1, f_2, \ldots f_N$ separated by a substantially constant inter-channel spacing given by $$\Delta f_S = f_{i+1} - f_i. \tag{1}$$

A typical frequency spacing $\Delta f_s$ is 100 GHz. Since the frequencies are narrowly spaced, it is sometimes easier to visualize the spacing in terms of wavelength spacing given approximately by $$\Delta \lambda_S = \frac{\lambda^2}{c} \Delta f_S. \tag{2}$$

In the case of a central wavelength of 1550 nm and a channel frequency spacing of 100 GHz, the channel wavelength spacing $\Delta \lambda_S$ is about 0.8 nm. An optical wavelength-division multiplexer 14 combines the optical signals of different wavelengths and outputs the combined signal on a single optical fiber 16. An optical receiver 20 includes a wavelength-division demultiplexer 22 which divides its received signals according to their optical wavelength to N optical detectors 24 according to the same wavelength allocation $\lambda_1, \lambda_2, \ldots \lambda_N$. In view of the reciprocity usually exhibited in passive systems, a wavelength-division demultiplexer may be substantially identical to a wavelength-division multiplexer with a reversal of their inputs and outputs.

Additionally, an optical addidrop multiplexer (ADM) 30 may be interposed on the optical path 16 between the transmitter and the receiver 20. The optical add/drop circuit 30 removes from the optical signal on the fiber 16 one or more wavelength channels at wavelength $\lambda_{AD}$ and inserts back onto the fiber 16 an optical data signal perhaps containing different information but at the same optical carrier wavelength $\lambda_{AD}$. The ADM 30 is typically implemented with technology closely resembling the WDMs 14, 22.

All-optical networks have been proposed in which a distributed network has many nodes each including a transmitter 10 and receiver 20 and which are linked by a functionally passive network which routes the signals between the nodes according to their wavelengths. The routing elements in such an all-optical network require switching elements similar to the ADM 30.

In order to maximize the transmission capacity of the optical fiber 16 and to utilize the usable bandwidth of certain elements such as erbium-doped fiber amplifiers, the wavelength channels $\lambda_1, \lambda_2, \ldots \lambda_N$ should be placed as closely together as possible with a minimum channel spacing $\Delta \lambda_S$. In advanced systems, this inter-channel spacing $\Delta \lambda_S$ is 1 nm or less for signals centered around 1300 or 1550 nm, the preferred bands for silica fiber. Such closely spaced WDM networks are referred to as dense WDM networks (DWDM).

The network design described above may be subject to a problem arising from the fact that the operation of the transmitter 10, receiver 20 and intermediate node 30 are all referenced to the same set of WDM wavelengths $\lambda_1, \lambda_2, \ldots \lambda_N$. However each of the distributed elements must provide its own wavelength calibration. Due to environmental and aging effects, the wavelength calibration settings at one element is likely to differ from those at other elements. In view of the close spacing of the optical channels, any miscalibration between network elements is likely to produce inter-channel interference.

For an optimized optical system, the fiber 16, the WDMs 14, 22, and the ADM 30 are typically designed to be single-mode at least at their ports for the optical wavelengths being used. Although each of the lasers 12 is likely emitting light across an exceedingly narrow bandwidth, the single-mode response of the frequency sensitive elements 14, 22, 30 usually has a wavelength (frequency) characteristic that approximates a gaussian distribution about the center wavelength $\lambda_0$ of the channel $F(\lambda) = \exp(-(\lambda - \lambda_0)/\partial \lambda_G)$. The value of the gaussian passband $\partial \lambda_G$ can be fairly freely chosen for present day fabrication techniques. However, the value of the passband is subject to countervailing restraints. For dense WDM systems, the inter-channel spacing $\Delta \lambda_S$ is made as small as possible. The gaussian passband $\partial \lambda_G$ must be substantially smaller than the inter-channel spacing $\Delta \lambda_S$ to avoid interference between channels. On the other hand, the frequency characteristics of the lasers 12 and other frequency-sensitive elements are subject to permanent or temporary variations. If the passband $\partial \lambda_G$ is made too small, the peak is very narrow and small variations in wavelength away from the peak wavelength $\lambda_0$ cause operation to shift to the sides of the peak, thereby degrading the signal strength. That is, for a strong signal the passband $\partial \lambda_G$ should be made as large as possible to provide a broad top of the peak.

Amersfoort et al. have already recognized these problems, as disclosed in U.S. Pat. No. 5,629,992, incorporated herein by reference in its entirety. This patent describes arrayed waveguide gratings, also called phasars, of the sort described by Hunsperger et al. in U.S. Pat. No. 4,773,063, and by Dragone in U.S. Pat. Nos. 5,412,744 and 5,488,680. In particular, Amersfoort et al. describe a WDM phasar 40 exemplified in the schematic illustration of FIG. 2. A single-mode waveguide 42 is coupled to one end of a multi-mode waveguide 44 of length chosen to produce a doubled image of the radiation from the single-mode waveguide 42 at a port 46 on one side wall 48 of a first free-space region 50. The width of the single-mode waveguide 42 is approximately equal to the wavelengths of the light it is carrying, taking into account the refractive index, to within near-unity constants. The multi-mode waveguide 44 has a larger width. The multi-mode waveguide 44 acts as a multi-mode interferometer (MMI). Multiple single-mode array waveguides 52 are coupled to ports on the other side of the first free-space region 50 in the form of a star coupler. The array waveguides 52 are coupled on the other end to one side of a second free-space region 54. The array waveguides 52 have lengths with predetermined length differences between them to act as an arrayed waveguide grating (AWG), operating similarly to a planar diffraction grating. Single-mode output waveguides 56 are coupled to the other side of the second free-space region 54 along its output wall 58. The AWG causes the multi-wavelength signal from the input waveguide 42 to be wavelength demultiplexed on the respective output waveguides 56. Because of the reciprocal nature of the device, the roles of input and output can be reversed so that the same structure can be used as a wavelength multiplexer or as a wavelength demultiplexer or as a demultiplexer. An AWG is one example of a wavelength-dispersive optical device. The placement and number of waveguides contemplated by Amersfoort et al. are wider than the example of a single input presented below.

The illustration of the optical circuit of FIG. 2 is somewhat schematic. The illustrated structure provides horizontal optical waveguiding and generally includes a high-index waveguide surrounded on four sides by a low-index cladding. The vertical waveguiding is typically accomplished by a layered or slab structure of low-index layers sandwiching a high-index waveguide layer. However, the two waveguiding structures can be combined in, for example, a ridge waveguide.

The MMI 44 is designed to convert the narrow gaussian optical field carried on the single-mode input fiber 42 into a significantly broader non-gaussian optical field at the interface 46 to the first free-space region 50. The wavelength characteristic of the free-space between the multi-mode waveguide 44 and the rest of the phasar 40 is therefore also flattened. As a result, with the use of the multi-mode interference filter 44, it is possible to obtain a phasar with a narrow wavelength passband $\partial\lambda$, as illustrated in the spectrum 60 of FIG. 3, but with a flattened top 62. The resultant transmission function $T(\lambda)$ is subject to smaller variations in response to small wavelength variations about the central values. However, the MMI solution of Amersfoort et al. is physically limited by a fixed relationship between the flatness and the passband $\partial\lambda$ since the illustrated spectra represent the sum of the two lowest lateral modes.

Somewhat similar results can be obtained using a Y-coupler which divides the single-mode input on input waveguide 42 between two single-mode waveguides entering the first free-space region 50. A widened signal is presented to the output waveguides 56, thus flattening the response.

The performance of any passband flattening technique similar to MMI or Y-branch is constrained by the fact that the desired rectangular response can only be approximated due to the finite slope or roll-off that can be obtained. The various techniques are differentiated by how well they approximate the optimum response. The optimum response corresponds to an optimum distribution in the output field. For a Y-branch design, the output field is constructed by the interference of two guide modes. For an MMI design, usually more than two guides modes are used, but the number is limited by enlarging sizes and increasing sensitivity to variations in wavelength and fabrication parameters.

In U.S. patent application Ser. No. 09/430,836, filed Nov. 1, 1999, now U.S. Pat. No. 6,289,147, incorporated herein by reference in its entirety, Bulthius et al. have disclosed an arrayed waveguide grating in which a Mach-Zehnder interferometer divides the input signal and introduces an optical length difference between them equal to the free spectral range of the phasar 40 before inputting them side by side to the multi-mode interference filter 44. This design compensates the movement of the Gaussian image in the output focal plane of the array waveguide grating and does not require transformation of the field, which for Y-branch and MMI results in a 2 dB power penalty. This design, however, requires that the Mach-Zehnder interferometer provides precisely 50:50 power splitting and a precise phase difference between the two signals. Such precision renders the fabrication to be difficult.

Another design for flattening the passband of a phasar, as disclosed in Japanese Laid-Open Patent Publication 9-298228, uses a linearly or parabolically shaped waveguide section between the single-mode waveguide and the free-space region. While the parabolic embodiment seems to achieve remarkable results, fabricating such a structure is considered very difficult.

Accordingly, it is desired to provide a phasar having improved flatness in its spectral response without sacrificing a narrow passband. It is further desired that this improvement be achieved with a design not requiring precise fabricational tolerances.

SUMMARY OF THE INVENTION

The invention may be summarized as a wavelength-dispersive optical device, such as a phasar, exhibiting flattened band pass characteristics relative to a gaussian passband having the same band width. A segmented waveguide is placed on the input wall or the output wall of the wavelength-dispersive device, and the size and placement of its segments are chosen for a flattened passband response.

In one aspect of the invention, a single-mode waveguide carrying an optical signal is coupled to the wavelength-dispersive optical device through a segmented waveguide comprising a plurality of segments of high-index materials relative to the lower-index surrounding cladding area. The segmented waveguide widens the optical field from a narrow single-mode field on the single-mode waveguide end to a broadened multi-mode field on the side of the free-space region.

The segmented waveguide may be placed on the input side of the wavelength-dispersive device or on the output side coupling at least one of the input or output ports to the device.

The invention includes a passband-flattened phasar having two optical interaction regions, for example, free-space regions, coupled by multiple waveguides of differing length.

Advantageously, the radiation is input to and output from the device on single-mode optical waveguides. The segmented waveguide may be interposed between one of the single-mode waveguides and the wavelength-dispersive device, for example, on the wall of one of the free-space regions. However, the invention is not limited to single-mode waveguides and may include a tapered waveguide, a multi-mode waveguide, or other type of optical port connected to the outer end of the segmented waveguide.

Preferably the segments are pairs of rectangular blocks symmetrically disposed about the principal axis although they may be continuous across the axis. The blocks may have constant widths along the principal axis but have differing widths transverse to the principal axis. However, other forms of the segments are possible, including more than two blocks arranged about the central axis. The central axis may bend, and the blocks may be asymmetrically disposed about an axis.

The segmented waveguide for this and other wavelength-dispersive applications may be designed with an evolutionary algorithm which evolves an initial design into an improved design by introducing fixed variations in widths of the individual segments and determining if such variations improve the passband flattening or other spectral characteristics at the other side of the wavelength-dispersive device.

The invention is particularly useful in a wavelength division multiplexing telecommunications network based on optical fiber.

DETAILED DESCRIPTION OF THE PREFERRED EMBODIMENTS

According to the invention, a segmented waveguide is interposed between the data carrying single-mode waveguide and one of the free-space regions of a phasar or arrayed waveguide (AWG) multiplexer/demultiplexer. The segmented waveguide consists of a number of discrete but discontinuous segments, typically composed of pairs of blocks symmetrically disposed about the principal optical axis.

Figure 2:
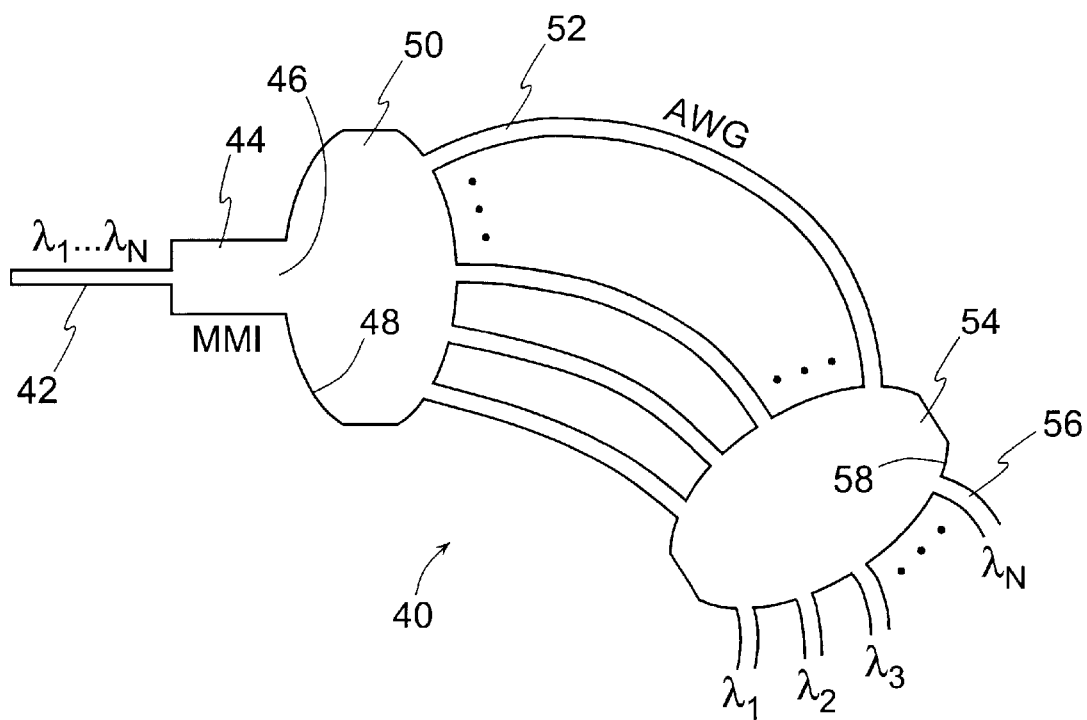
FIG. 2 is a plan view of a prior-art phasar using an arrayed waveguide grating (AWG) that can be used as part of the WDM system of FIG. 1.
Figure 3:
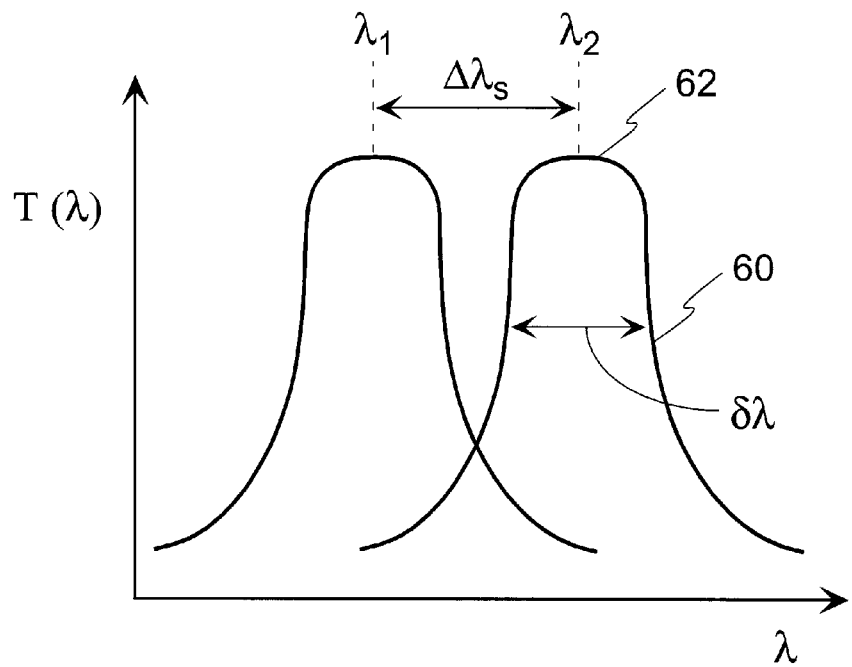
FIG. 3 is a schematic illustration of transmission spectra showing the effect of passband flattening.
Figure 4:
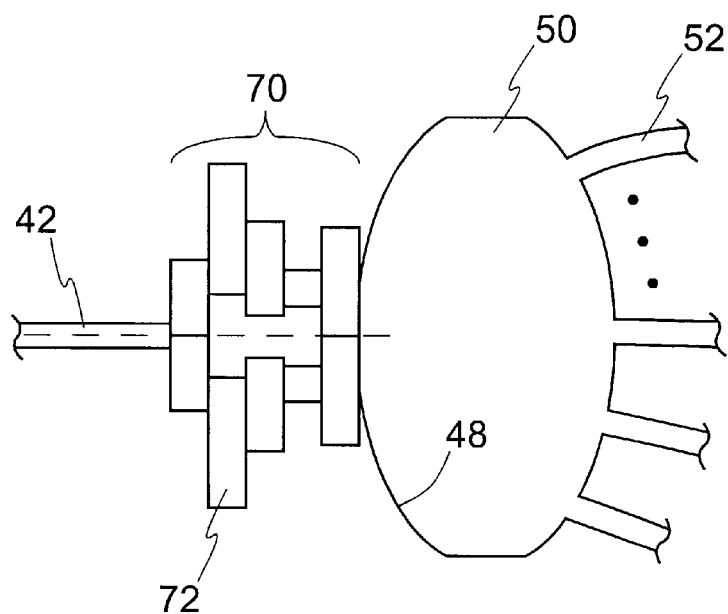
FIG. 4 is a schematic plan view of part of phasar including a segmented waveguide.

A schematic example of a flattened passband phasar of the invention is illustrated for part of a phasar illustrated in the schematic plan view of FIG. 4. A segmented waveguide section 70 is interposed between the single-mode input waveguide 42 and the input wall 48 of the first free-space region 50. The rest of the phasar of the invention may remain the same as the prior-art phasar 40 of FIG. 2. The segmented waveguide section 70 consists in this embodiment of a plurality of segments, each including two symmetrically placed rectangular blocks 72. Each of the blocks 72 consists of the same material and/or structure used in fabricating the single-mode waveguide 42 and the free-space region 50. That is, the material and/or structure of the blocks 72 is a high-index material relative to the material laterally outside of the blocks 72. In the case of a ridge-waveguide structure, the single-mode waveguide 42 is defined by a narrow surface ridge, and each of the blocks 72 is defined by a mesa of the same height as the ridge and with a width and length dependent upon the size of the block 72. Alternatively, in the case of buried heterostructure waveguide, a buried layer is composed alternately of materials of differing refractive index. Thereby, the segmented waveguide 70 can be fabricated by the same processes used in fabricating a conventional phasar with appropriate changes in one or more of the photomasks.

A segmented waveguide is capable of providing improved passband flattening over the Y-branch and MMI techniques discussed in the background sections. Passband flattening attempts to approximate a rectangular spectral response, and an optimum spectral response corresponds to an optimum distribution in the output field, which is generally not rectangular. As was mentioned, the prior art techniques are limited in the number of guided modes that can be used in achieving the optimum field distribution, but a segmented waveguide can be designed to produce many modes of differing strengths and phases, thus permitting a better optimized performance.

Figure 5:
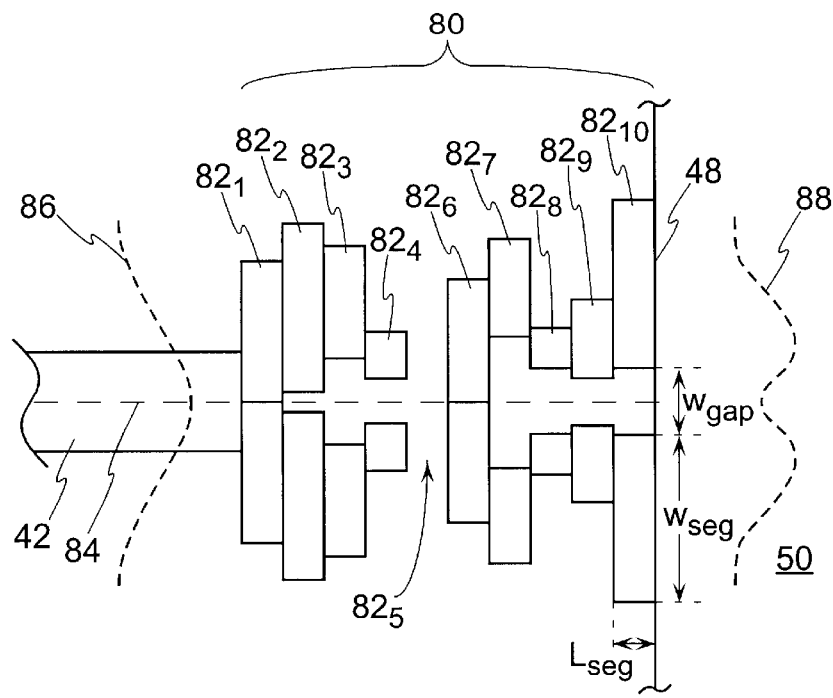
FIG. 5 is a schematic plan view of a segmented waveguide.

A more detailed but still schematic plan view of a segmented waveguide 80 is illustrated in FIG. 5. It includes $N_{seg}$ segments comprising respective pairs of rectangular blocks $82_1$, $82_2$, $82_3$, $82_4$, $82_5$, $82_6$, $82_7$, $82_8$, $82_9$, $82_{10}$ arranged symmetrically about a central axis 84. Each block is formed of high-index material relative to surrounding low-index materials according to respective values of length $L_{seg}$ along the axis and width $w_{seg}$ transverse to the axis 84 and which are separated by a respective transverse gap $w_{gap}$. The central axis 84 is also the central axis of the single-mode waveguide 42 and is perpendicular to the curving free-space sidewall 48 at that point. In this illustrative embodiment, it is noted that two pairs of blocks $82_1$, $82_6$ are separated by a zero gap $w_{gap}$ and thus each of these pairs is continuous between the pair. On the other hand, the block pair $82_5$ is a null segment consisting of no high-index material.

An immediate purpose of the segmented waveguide 80 is to convert a single-mode, optical field 86 carried along the single-mode waveguide 42 to a modified, non-gaussian output field 88. While the single-mode optical field 86 generally has a gaussian shape with a single peak, the output field 88 is non-gaussian, here represented as containing two distinct peaks. The output field 88 is overall typically broader than a gaussian distribution associated with the peaks of the output field 88. The precise form of the output field 88 depends upon the determination of the segmented waveguide parameters $L_{seg}$, $W_{seg}$, and $W_{gap}$ for each of the block pairs. Although the output field 88 is illustrated as being wider than the single-mode field 86, the important parameter is not the breadth or even the flatness of the field, but the flatness of spectral response of the phasar incorporating the segmented waveguide. It is possible to maintain or even decrease the field width relative to the single-mode gaussian field while advantageously increasing the flatness of the phasar's spectral response.

The optical field at the input wall 48 of the first free-space region 50 adjacent the output of the segmented waveguide 70 needs to be transported to the output wall 58 of the second free-space region 54 as an output field. In a properly operating arrayed waveguide grating, the two fields should have nearly identical distributions although there will be shifts in the focal plane when the frequency or wavelength changes. The spectral response of the phasar is generally the overlap of the output field at the output wall 58 with the response of the output waveguide 52 across its input face. In the case that the output waveguides 52 are single-mode, this spatial response is generally gaussian. It is desired to as flatten the spectral response represented by this overlap of output field and receiver sensitivity relative to a gaussian spectral response. Ideally, the convolution of the output field and the receiver sensitivity is a rectangular response. More generally, the response should be flatter than a gaussian response and with steeper fall off. The flatness of the spectral response may possibly be obtained with a relatively narrow output field.

The simulation procedure employed in optimizing the response need not propagate fields through the arrayed waveguide grating as long as the response of the grating is approximately known and can be used to convert the input optical field to the output optical field.

The segmented waveguide 80 illustrated in FIG. 5 is aperiodic along the central axis in contrast to a periodic segmented waveguide that more resembles an optical grating. Spühler et al. have described an aperiodic segmented waveguide in "A very short planar silica spot-size converter using a nonperiodic segmented waveguide, *Journal of Lightwave Technology,* vol. 16, no. 9, September 1998, pp. 1680–1685. This converter is used to match the mode sizes between integrated waveguide structures and fibers, and no flattening is suggested.

An evolutionary algorithm provides an efficient method of determining the many parameters of a segmented waveguide. Fogel describes in general terms such evolutionary algorithms in "What is evolutionary computation," *IEEE Spectrum,* February 2000, pp. 26–32. An entire journal *IEEE Transactions on Evolutionary Computation* is now devoted to the topic. Spühler et al. in "An evolutionary optimzation procedure applied to the synthesis of integrated spot-size converters," *Optical and Quantum Electronics,* vol. 20, 1998, pp. 305–321 have described the application of such an algorithm to designing a segmented waveguide for converting the optical field between a ridge waveguide and a single-mode fiber. Evolutionary algorithms resemble Darwin's evolutionary process in which random variations are introduced into a population. Only the fittest of the population survive. Here, the fitness is determined according the circuit's performance in providing a narrow, flattened, low-loss passband across the phasar. Since the passband is not gaussian, the preferred bandwidth is wide for relatively small values of attenuation but narrow for large values of attenuation. The preferred passband most closely resembles a rectangular response and has a flat top with fast roll-off on the sides.

Figure 6:
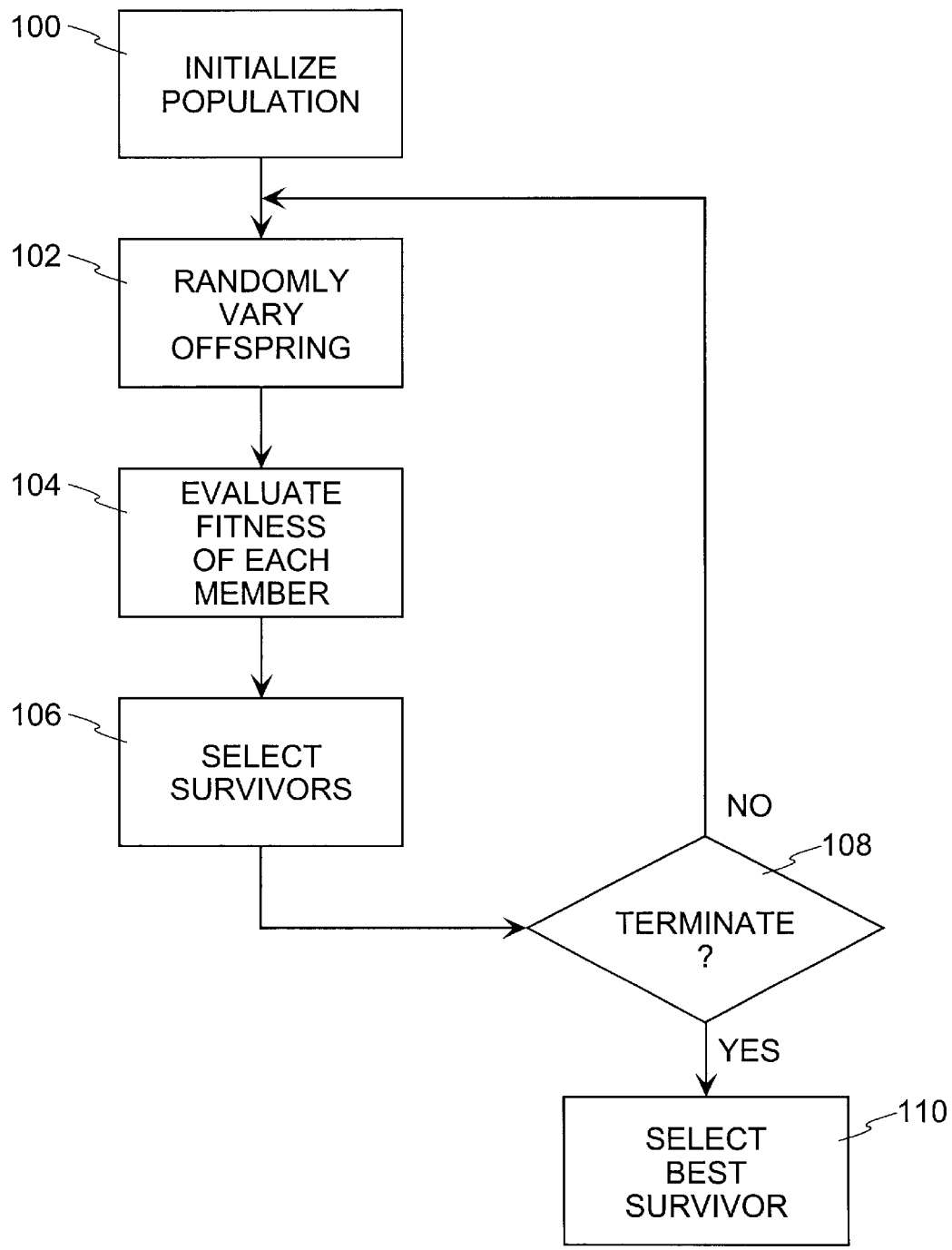
FIG. 6 is a flow chart for an evolutionary algorithm usable with the invention.

An evolutionary algorithm, as illustrated in the general flow diagram of FIG. 6, includes an initial step 100 of initializing the population by creating ab initio one or more initial designs for the segmented waveguide. The initial designs include the invariant features of vertical structure, its thicknesses and doping levels, as well as the radiation wavelength. The variant features include perhaps the number $N_{seg}$ of segments, their respective lengths $L_{seg}$, their respective widths $w_{seg}$, and their respective gaps $w_{gap}$. To simplify the evolutionary algorithm, the number $N_{seg}$ of segments may be set to an invariant value, and their respective lengths $L_{seg}$ are set to a common invariant value in view of common experience of successful designs. Hence, each member of the initial population is described by respective $N_{seg}$ values of the two variables $w_{seg}$ and $w_{gap}$.

In step 102, one or more random variations (in the values of $w_{seg}$ and $w_{gap}$) are introduced into the population to create offspring varying in one or more characteristics, from their parent. The differences may be small, but in some methods large differences are generated, for example, by taking some characteristics from each of two parents and combining them to produce the offspring. The procedure of Spühler et al. gives guidance for the variational procedure, but others are possible.

In step 104, the fitness of each candidate or member of the population is determined. The fitness in this case depends upon the bandpass characteristics of the phasar, most importantly the member's flatness and its roll-off, as measured by 3 dB and 10 dB points, for example. The flatness and roll-off may be quantized by calculating derivatives of the wavelength characteristic around the peak, for example, $\delta T/\delta \lambda$ and $\delta^2 T/\delta \lambda^2$. However, other methods are possible, That is, the fitness is determined from transmission spectra calculated for each of the members of the population. The fitness increases with a closer approximation to a rectangular spectral response. The greater the flatness, the higher the bandwidth. Faster roll-off is also desired. In the design procedure, all these characteristics should be optimized as much as possible. Additionally, the power penalty should be minimized, that is, the reduction in maximum transmission.

However, it is noted that the transmission spectrum of a phasar can be equivalently determined by calculating the lateral optical distribution of a single wavelength signal on the output wall of the second free-space region after the radiation has passed through the phasar and convoluting this distribution with a known output waveguide response since the phasar equates wavelength and spatial position on that wall.

The fitness needs to be determined by performing calculations which propagate the single-mode optical field through the segmented waveguide and then, at least in principle, through the rest of the phasar to the output plane of the phasar although the propagation across the phasar is independent of the specifics of the segmented waveguide except for the field distribution at the output of the segmented waveguide. The calculation also needs to include the response of the output waveguide to the optical field presented to it. In principle, the calculation involves evaluating the propagation of the single-mode input field through the entire devices as a function of wavelength. Such calculations are well known for semiconductor optical devices and may be either two-dimensional or three-dimensional calculations. However, the calculation can be simplified by assuming that the output field of the segmented waveguide is imaged perfectly on the output focal plane of the array waveguide grating, but is only shifted in accordance with the used wavelength. As a result, only the input waveguide, segmented-waveguide structure, and the output waveguide with a certain wavelength-dependent lateral displacement need to be evaluated. The beam propagation method (BPM) may be used to calculate the characteristics of each design. Hoekstra describes BPM in "On beam propagation methods for modeling in integrated optics," *Optical and Quantum Electronics,* vol. 29, 1997, pp. 157–171. The BPM procedure calculates the propagation of an optical field through a structure defined at least in part by the refractive indices of its parts. Starting with a known input distribution, for example, a mode having gaussian distribution, the calculation modifies the distribution as the radiation propagates through the structure. At the end, the field can be analyzed to establish characteristics of the structure, for example, the amount of power left in the fundamental mode at a given position in the structure.

In step 106, the surviving population is selected based upon the fitness determination of step 104. In a simplest algorithm, a number M of individuals in the population are maintained which have the highest fitness values. More complex selection criteria are possible, for example, so as to not prematurely exterminate one line of ancestry.

In step 108, it is determined whether the evolutionary algorithm should be terminated with the selection in step 110 of the currently best solution having the highest fitness value. The determination may be determined by the number of iterations or by some present threshold of fitness. If the algorithm is not terminated, flow returns to step 102 for creating yet another generation of offspring.

The output of the evolutionary algorithms are the $N_{seg}$ pairs of block parameters $w_{seg}$ and $w_{gap}$.

It is understood that the extent of blocks extending far from the principal axis becomes less important so that the larger blocks need not be completely symmetric across the principal axis. It is also understood that the evolutionary algorithm can be applied to a system having more variant parameters and a structure that does not require a pair of block symmetrically disposed about a straight axis.

Figure 7:
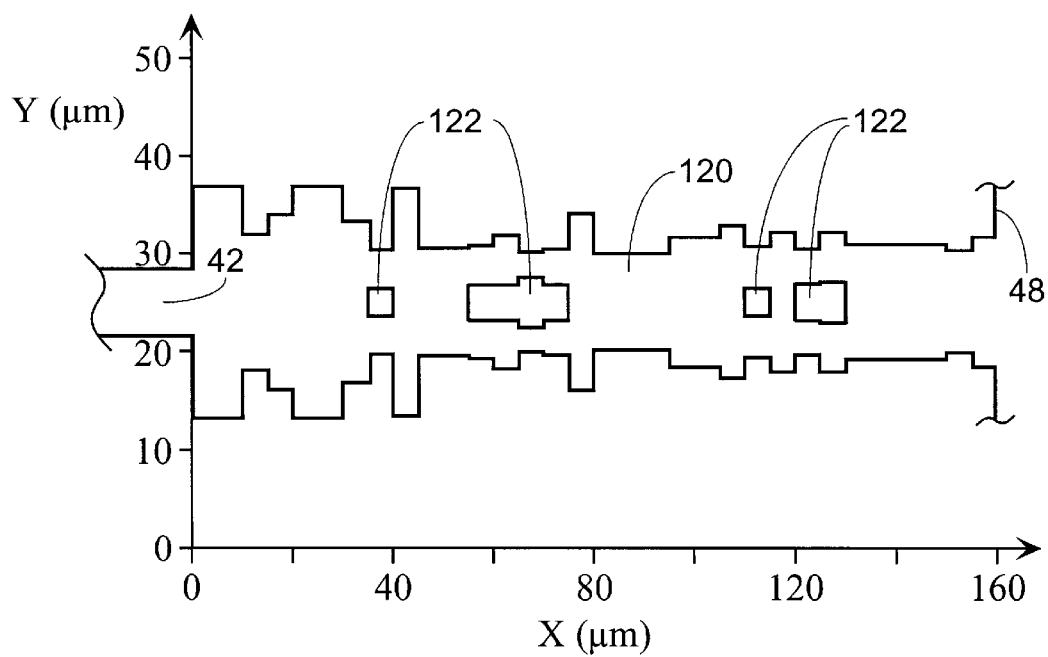
FIG. 7 is detailed plan view of a segmented waveguide.
Figure 8:
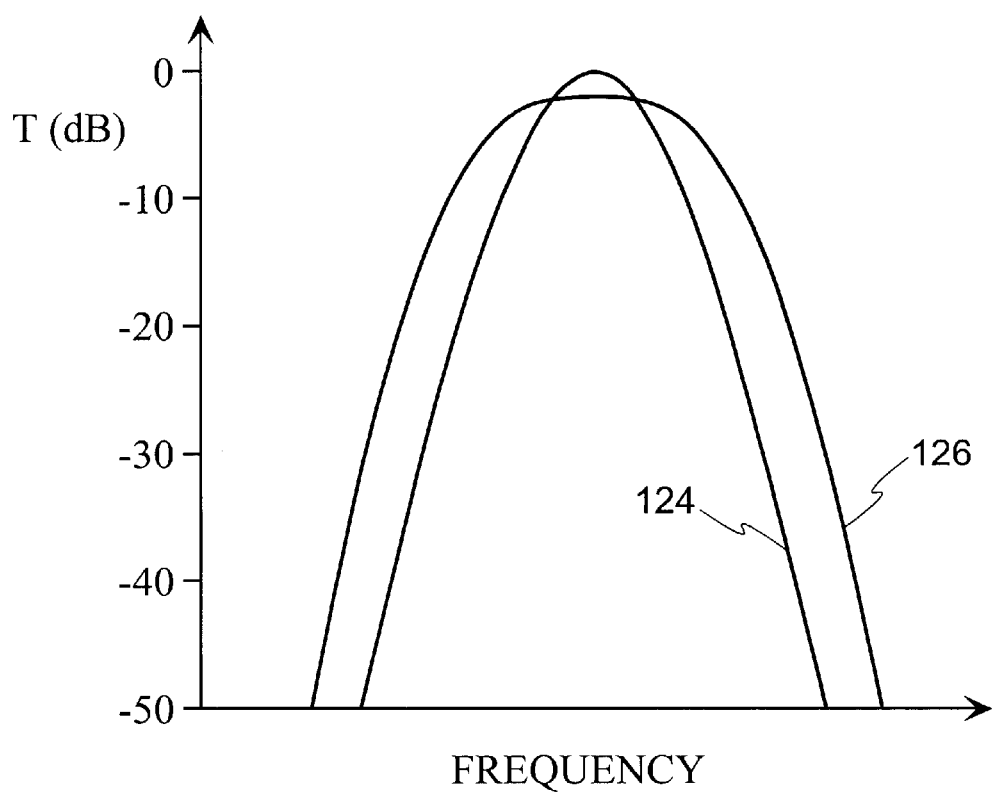
FIG. 8 is a graph comparing the gaussian passband of the prior art with the flattened passband of the invention.

This evolutionary algorithm was applied to produce a segmented waveguide 120 illustrated in the graph of FIG. 7. In the invariant design, the segmented waveguide 120 has a length of 155 μm and a maximum width of 24 μm, and thirty one segments of equal length $L_{seg}$ extend over the 155 μm. The evolutionary algorithm selects an optimized survivor in which most of the segments have a zero gap $w_{gap}$ although four gaps 122 are formed between segments in the middle. The bandpass characteristics, more precisely the transmission spectrum for a conventional design is plotted in FIG. 8 by spectrum 124 for a single-mode waveguide directly connected to the free-space region. The conventional spectrum 124 is describable as a gaussian distribution. On the other hand, the inventive segmented waveguide 1210 of FIG. 6 placed between the single-mode waveguide 42 and the first free-space region produces the spectrum 126. The inventive design increases the 1 dB passband by a factor of 2.7, and the 3 dB passband by a factor of 2.1 over the gaussian spectrum 124. The maximum transmission loss is 2 dB. Importantly, the flattened spectrum 126 for the phasar including the segmented waveguide has a much flatter top as well as a wider bandpass than the conventional phasar with the generally gaussian passband 124. Further evaluation has shown that the fabricational tolerance and the polarization dependence of the optimized segmented-waveguide design are comparable to those of the multi-mode interference filter design of Amersfoort et al.

Figure 1:
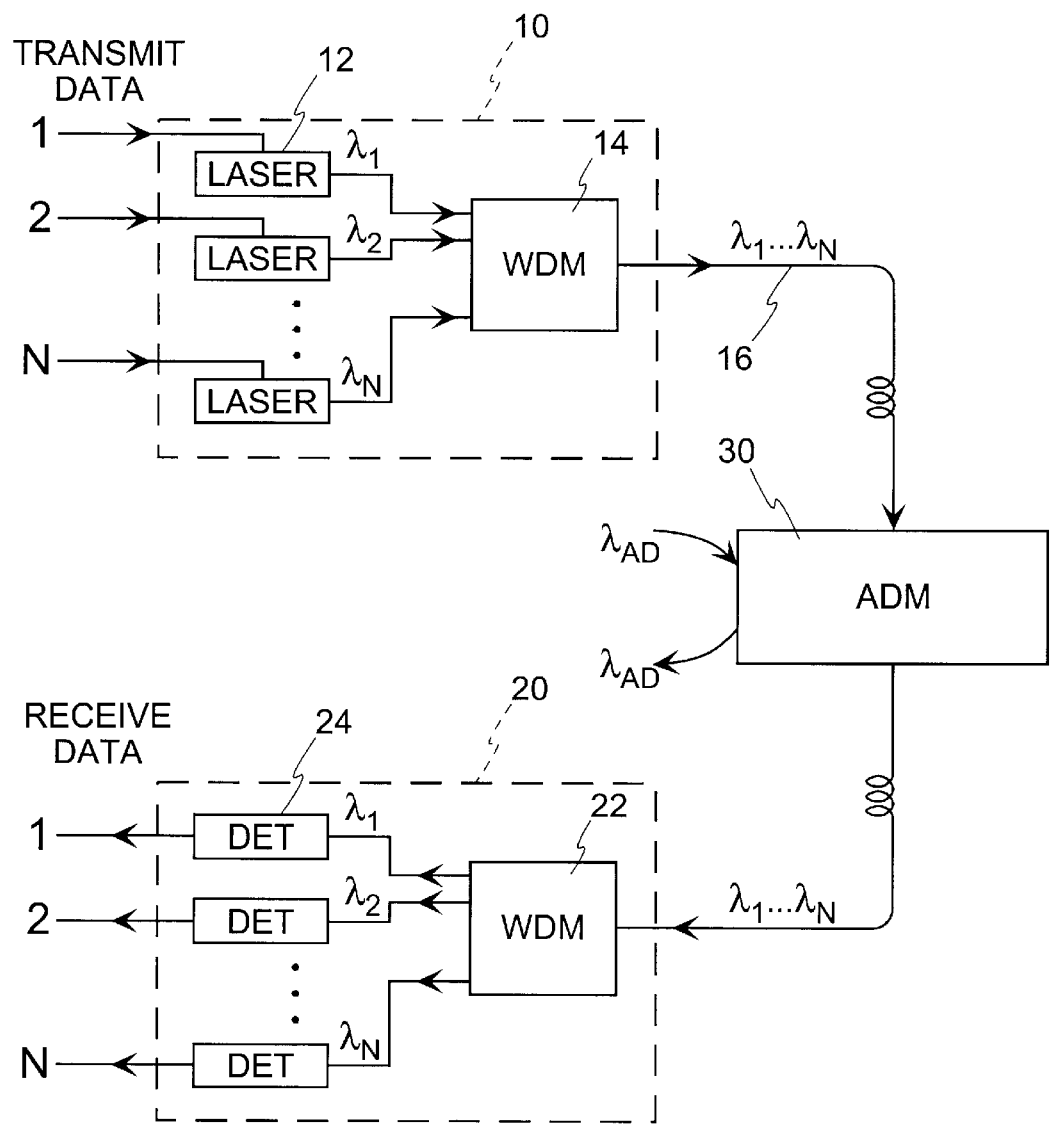
FIG. 1 is a circuit diagram of a wavelength division multiplexing (WDM) telecommunication system.

One important application of the phasar of the invention including one or more segmented waveguides is in a WDM communications network such as that illustrated in FIG. 1. The phasar can be used in the multiplexer, the demultiplexer, the add/drop multiplexer, the unillustrated all-optical switching node, or in a combination of these elements.

Although the invention has been explained with reference to an embodiment of a demultiplexer having 1 input and N outputs, it is well known that because of linear reciprocity this same design operates as a multiplexer having N inputs and 1 output. Furthermore, the segmented waveguide can be placed either at the end of the single port or be placed at one or more of the N ports at the other end, or segmented waveguides can be placed at both ends. Further, it is known that the same general design for a phasar may be implemented with multiple ports on both its input and output sides. In this case, the segmented waveguides may be placed on the ports at either side.

The discussion of the preferred embodiments has assumed that the segmented waveguide is aligned along an axis perpendicular to the face of the free-space region. However, small inclinations from the perpendicular, for example, of 2° or less, will not significantly affect the results. Furthermore, the various waveguide structures may have a more complicated structure than a simple, homogeneous planar core. Instead, a gradient-index core or a multi-layer core may be used.

The embodiments described above directly connected a single-mode waveguide to the segmented waveguide. It is alternatively possible to interpose another type of optical between them, for example, a tapered waveguide of gradually varying width along which the single-mode waveguide is coupled to the segmented waveguide. Furthermore, the passband flattening is not necessarily limited to input or output waveguides being single mode. In some applications, a linearly propagating input or output waveguide is not required. For example, the segmented waveguide could be placed between one of the free-space regions and the edge of the die forming the input or output port of the phasar.

Although the segments have been described in terms of symmetric pairs of rectangular blocks, the segments may have other non-smoothly varying forms. It is known to curve the sides of the blocks generally perpendicular to the principal axis while leaving the sides generally parallel. It is also possible to incline the sides of the blocks otherwise arranged along the principal axis. The number of blocks at an axial location may be selected to be other than two, for example, one, three, or four, or even more. Also, the segments may be asymmetric in the direction perpendicular to the central axis, which may cause the principal propagation direction of the radiation to not follow a linear axis. The principal axis may be slowly bending with the blocks arranged on either side thereof. The lengths of different segments may have different lengths.

The form of the free-space region may be other than that usually associated with a star coupler, for example, a multi-mode interference (MMI) filter or a slab coupler, which is a generalized star coupler which allows the slab waveguide to be connected to other forms of optical waveguides such as fibers, multi-mode waveguides, or MMI filters. All these structures can be characterized as optical interaction regions. Furthermore, the invention is based upon passband flattening of an optical wavelength-dispersive device and is not limited to arrayed waveguide structures.

The evolutionary algorithm for designing segmented waveguides can be applied to flattening the passband of other types of wavelength-dispersive optical devices.

The invention thus provides a significantly flattened passband for phasars with only minor changes in the fabrication process. The invention can also be applied to tailoring the spectral characteristics of other types of wavelength-dispersive optical devices.

What is claimed is:

1. An optical device, comprising:
    a wavelength dispersive structure having first and second sides between which an optical signal propagates between a first position on said first side and a second position on said second side, a correspondence between said first and second positions depending upon a wavelength of said optical signal; and
    a segmented waveguide adjacent to said first position of said first side for coupling said optical signal to or from said wavelength dispersive structure, comprising at least five pairs of rectangular blocks disposed on opposite sides of a propagation direction of said optical signal in said segmented waveguide, and flattening a passband of said optical device relative to a guassian passband.

2. The optical device of claim 1, wherein said wavelength dispersive structure is an array waveguide grating comprising:
   a first optical interaction region including said first side;
   a second optical interaction region said second side; and
   a plurality of waveguides coupling inner sides of said first and second optical interaction regions opposed to said first and second sides respectively.

3. An optical device, comprising:
   a wavelength dispersive structure having first and second sides between which an optical signal propagates between a first position on said first side and a second position on said second side, a correspondence between said first and second positions depending upon a wavelength of said optical signal; and
   a segmented waveguide adjacent to said first position of said first side for coupling said optical signal to or from said wavelength dispersive structure, comprising at least five pairs of blocks with sharp transitions therebetween, and having an aperiodic structure.

4. A phasar, comprising:
   an arrayed waveguide grating structure;
   at least one first waveguide on a first side of said structure and at least one second waveguide on a second side of said structure, said arrayed waveguide grating structure wavelength dispersively coupling said first and second sides through wavelength channels coupling pairs of a respective one of said at least one first waveguide and a respective one of said at least one second waveguide, each of said wavelength channels having a transmission passband associated therewith; and
   a segmented waveguide disposed between said first waveguide and said arrayed waveguide grating structure, comprising at least five pairs of rectangular blocks disposed on opposite sides of a propagation direction of said optical signal in said segmented waveguide, and flattening each of said transmission passbands relative to a guassian passband.

5. The phasar of claim 4, wherein said segmented waveguide has an aperiodic structure.

6. The phasar of claim 4, wherein said first and second waveguides comprise single-mode waveguides.

7. A phasar, comprising:
   a first optical interaction region;
   a second optical interaction region;
   a plurality of waveguides coupling inner sides of said first and second optical interaction regions;
   an optical port on an outer side of said second optical interaction region opposite said plurality of waveguides; and
   a segmented waveguide coupled to an outer side of said first optical interaction region opposite said plurality of waveguides and arranged along a radiation propagation direction for radiation passing through said first and second optical interaction regions and said plurality of waveguides and comprising a plurality of pairs of blocks disposed on opposite sides of said radiation propagation direction comprising a first material having a higher index of refraction than a second materially laterally outside of said blocks;
   wherein at least one of said pairs is composed of two of said blocks separated by said second material.

8. The phasar of claim 7, wherein said segmented waveguide is aperiodic along said radiation propagation direction.

9. The phasar of claim 7, wherein said radiation is input into said phasar to said segmented waveguide on a side thereof opposite said first optical interaction region.

10. The phasar of claim 7, wherein said radiation is input into said phasar through said optical port into said second optical interaction region.

11. The phasar of claim 7, further comprising a single-mode first waveguide coupled to a side of said segmented waveguide opposite said first optical interaction region.

12. The phasar of claim 11, further comprising a tapered waveguide interposed between first waveguide and said segmented waveguide.

13. The phasar of claim 11, further comprising a single-mode second waveguide coupled to said optical port.

14. The phasar of claim 7, wherein said segmented waveguide is arranged along a principal axis.

15. The phasar of claim 7, wherein said segmented waveguide comprises a plurality of sets of one or more blocks disposed on opposite sides of said radiation propagation direction, said blocks having sizes which flatten a passband of said phasar relative to a gaussian passband.

16. A phasar, comprising:
   a first optical interaction region;
   a second optical interaction region;
   a plurality of waveguides coupling said inner sides of said first and second optical interaction regions;
   at least one single-mode first waveguide coupled to an outer side of said first optical interaction region;
   at least one single-mode second waveguide coupled to an outer side of said second optical interaction region; and
   a segmented waveguide coupled between one of said at least on first waveguide and said first optical interaction region along a principal axis, and comprising at least five pairs of blocks disposed on opposite sides of a propagation direction of said optical signal, and flattening a passband of said phasar relative to a guassian passband.

17. The phasar of claim 16, wherein said segmented waveguide is aperiodic along said principal axis.

18. The phasar of claim 16, wherein said first and second optical interaction regions are free-space regions.

19. The phasar of claim 16, wherein said segmented waveguide comprises a plurality of sets of one or more blocks disposed on opposite sides of said principal axis, said blocks having sizes which flatten a passband of said phasar relative to a gaussian passband.

20. A wavelength-division multiplexing (WDM) communication system comprising multiple single-mode optical channels carrying a multiplicity of optical signals having respective optical carrier wavelength, said system comprising:
   a wavelength routing phasar; and
   a segmented waveguide (1) operatively interposed between said phasar and a first of said single-mode optical channels on a first side of said phasar, (2) coupling a first optical field adjacent said one single-mode optical channel and a second optical field on a second side of said phasar opposite said first side and adjacent a second of said single-mode optical channels, (3) comprising at least five pairs of rectangular blocks disposed on opposite sides of a propagation direction of said optical signal;
   wherein a spectral response between said first and said second single-mode optical channels is flatter than a gaussian response.

21. The communication system of claim 20, wherein said second optical field is wider than a gaussian peak.

22. The communication system of claim 20, wherein said single-mode optical channels comprise single-mode optical fibers.

23. The communication system of claim 22, further comprising a plurality of communication nodes interconnected by said optical fibers, at least one of said nodes including said phasar and said segmented waveguide.

24. The communication system of claim 20, wherein said segmented waveguide comprises a plurality of pairs of blocks aperiodically arranged along and disposed on opposite sides of a radiation propagation direction.

25. A method of designing a spectrally tailored optical device, comprising the steps of:

providing an invariant design including an optical port, a wavelength dispersive element, and a segmented waveguide having ends operatively coupled to said optical port and a first side of said wavelength dispersive element, said first side and a second side of said wavelength dispersive element providing an input and an output of said element;

providing one or more initial members of a population including variant parameters of said segmented waveguide, said initial members being the existing members during the first operation of the following step; and cyclically performing an evolutionary selection process including the substeps of creating further members of said population by randomly varying said variant parameters possessed by already existing members of said population, determining a fitness criterion for each member of said population after said creating step, said fitness criterion including a characteristic determined at said second side of said wavelength dispersive element, selecting surviving members of said population according to said values of said fitness criterion for all members, and determining if said evolutionary selection process should be termination, wherein if said evolutionary selection process is terminated, selecting the member of said population having the best value of said fitness criterion, and wherein if said evolutionary selection process is not terminated, repeating the evolutionary selection process with the surviving members being the existing members.

26. The process of claim 25, wherein the wavelength dispersive element is a phasar.

27. The process of claim 25, wherein said optical port is an end of a single-mode waveguide.

28. The process of claim 25, wherein said fitness criterion includes a flatness of spectral response.

29. The optical device of claim 1, wherein said segmented waveguide consists of a sequence of said rectangular blocks with abrupt transitions between neighboring blocks along said sequence.

30. The optical device of claim 1, wherein rectangular blocks are arranged in pairs across a propagation direction of said signal, at least one of said pairs being composed of respective blocks separated by material of a lower index of refraction than that of the material of said respective blocks.

31. An optical device, comprising:

a wavelength dispersive structure having first and second sides between which an optical signal propagates between a first position of said first side and a second position on said second side, a correspondence between said first and second positions depending upon a wavelength of said optical signal; and a segmented waveguide adjacent to said first position of said first side for coupling said optical signal to or from said wavelength dispersive structure and comprising a plurality of pairs of blocks disposed on opposite sides of a radiation propagation direction of said optical signal in said segment waveguide and comprising a first material having a higher index of refraction than a second materially laterally outside of said blocks;

wherein at least one of said pairs is composed of two of said blocks separated by said second material.

32. The optical device of claim 31, wherein said blocks within each pair have a same rectangular shape.

33. The optical device of claim 31, wherein said blocks are sized to flatten a passband of said optical device relative to a guassian passband.

34. A phasar, comprising:

an arrayed waveguide grating structure;

at least one first waveguide on a first side of said structure and a plurality of second waveguides on a second side of said structure, said arrayed waveguide grating structure wavelength dispersively coupling said first and second sides through wavelength channels coupling pairs of a respective one of said at least one first waveguide and a respective one of said plurality of second waveguides, each of said wavelength channels having a transmission passband associated therewith; and a segmented waveguide comprising a plurality of segments serially arranged between said first waveguide and said arrayed waveguide grating structure and flattening each of said transmission passbands relative to a guassian passband.

35. The phasar of claim 34, wherein said segmented waveguide has an aperiodic structure.

36. The phasar of claim 34, wherein said first and second waveguides comprise single-mode waveguides.

* * * * *